United States Patent
Tuttle et al.

(10) Patent No.: US 7,120,721 B1
(45) Date of Patent: Oct. 10, 2006

(54) FIBRE CHANNEL ARCHITECTURE PORT HAVING OPTICAL AND COPPER CONNECTORS

(75) Inventors: James M. Tuttle, Lunenburg, MA (US); Douglas E. Peeke, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 52 days.

(21) Appl. No.: 10/228,513

(22) Filed: Aug. 27, 2002

(51) Int. Cl.
*G06F 9/00* (2006.01)
*G06F 13/38* (2006.01)
*G02B 6/36* (2006.01)

(52) U.S. Cl. .................. 710/305; 710/72; 385/55; 370/464

(58) Field of Classification Search ................ 710/300, 710/305, 62, 72, 2; 185/53; 361/683; 370/431, 370/464; 713/100; 187/247
See application file for complete search history.

(56) References Cited

U.S. PATENT DOCUMENTS

| | | | | |
|---|---|---|---|---|
| 4,193,478 A | * | 3/1980 | Keller et al. ................ | 187/247 |
| 5,455,556 A | * | 10/1995 | Ohm et al. .................. | 338/114 |
| 5,647,379 A | * | 7/1997 | Meltzer ....................... | 128/897 |
| 6,058,076 A | * | 5/2000 | Komninos ................... | 367/135 |

OTHER PUBLICATIONS

"Architecture for real-time LPC-based feature measurement integrated circuit" by Oh, Y.; Ackenhusen, J.; Breda, L.; Rosa, L.; Brown, M.; Niles, L. (abstract only) Publication Date: Mar. 1984.*

* cited by examiner

*Primary Examiner*—Gopal C. Ray
(74) *Attorney, Agent, or Firm*—BainwoodHuang (57) ABSTRACT

First and second inputs are associated with a port. Logic produces indications to software to cause the first input and second input to appear as a single input to the software. The logic produces an indication that no signal is present on either the first input or the second input. When a port bypass controller is coupled to the port, the logic produces an indication that both the first and second inputs are bypassed. When the port bypass controller is coupled to a Fibre Channel arbitrated loop, the logic produces a first signal to control whether the first input is included on the Fibre Channel arbitrated loop or bypassed, and a second signal to control whether the second input is included in the Fibre Channel arbitrated loop or bypassed.

10 Claims, 6 Drawing Sheets

FIBRE CHANNEL ARCHITECTURE PORT HAVING OPTICAL AND COPPER CONNECTORS

FIELD OF THE INVENTION

The present invention relates generally to connector input architectures, and more particularly to the efficient provision of multiple different connector types in a system.

BACKGROUND OF THE INVENTION

The various devices that constitute a storage system, for example disk drives and host computing systems, are commonly interconnected via a high speed serial channel technology known as Fibre Channel arbitrated loop. Copper cables can be used to interconnect Fibre Channel devices that are relatively close together. However, copper cables are not capable of transmitting the high speed signals more than a few tens of meters. So, in order to connect, for example, a host system Fibre Channel interface to a Fibre Channel storage system in another room, an optical cable is used. Optical cables are capable of transmitting the high speed signals hundreds of meters.

Copper cables and optical cables use different, incompatible connectors. Storage devices should preferentially support either type of connector, since a given customer's requirements are not known. One way to do so is to produce two different storage devices—one with a copper connector, and one with an optical connector. This solution is disadvantageous in that two separate devices need to be manufactured and supported, and customers have limited flexibility in the arrangement of their systems once the devices have been purchased. Another solution involves the use of an optical cable adapter that plugs into the copper connector. However, these adapters have been found to be unreliable. In addition, special cables are required when using these adapters, forcing the customer to purchase more components and again limiting flexibility. Furthermore, many storage devices are already configured to support copper connectors. In order to modify the storage device to support an optical connector, hardware and software changes must be made so that the processor in the storage device can control the optical cable connection. This disadvantageously results in the need to produce and maintain two different software bases—one for the device that supports the copper connector, and another for the device that additionally supports the optical connector.

What is needed is a way to provide a storage device capable of supporting either copper or optical connections, such that different types of devices need not be manufactured, and such that a device that supports a copper connector can be modified to support an optical connector without the need for any software changes.

SUMMARY OF THE INVENTION

In accordance with the invention there is provided an apparatus wherein first and second inputs are associated with a port, and wherein logic produces indications to software to cause the first input and second input to appear as a single input to the software. More specifically, the logic produces an indication that no signal is present on either the first input or the second input. When a port bypass controller is coupled to the port, the logic produces an indication that both the first and second inputs are bypassed. According to a particular embodiment, the port bypass controller is coupled to a Fibre Channel arbitrated loop. The logic then produces a first signal to control whether the first input is included on the Fibre Channel arbitrated loop or bypassed, and a second signal to control whether the second input is included in the Fibre Channel arbitrated loop or bypassed. Similar methods are provided in accordance with the invention.

The invention advantageously allows the provision of two input connectors, for example a copper connector and an optical connector, in a manner that is transparent to software, because the logic causes the two input connectors to appear to the software as a single connector.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

In accordance with the present invention, a system is provided in which two input connectors appear to a processor and software in a system to be a single input connector. This is particularly advantageous when modifying a system including a single connector so that it supports two connectors, because no software modifications are required.

Figure 1:
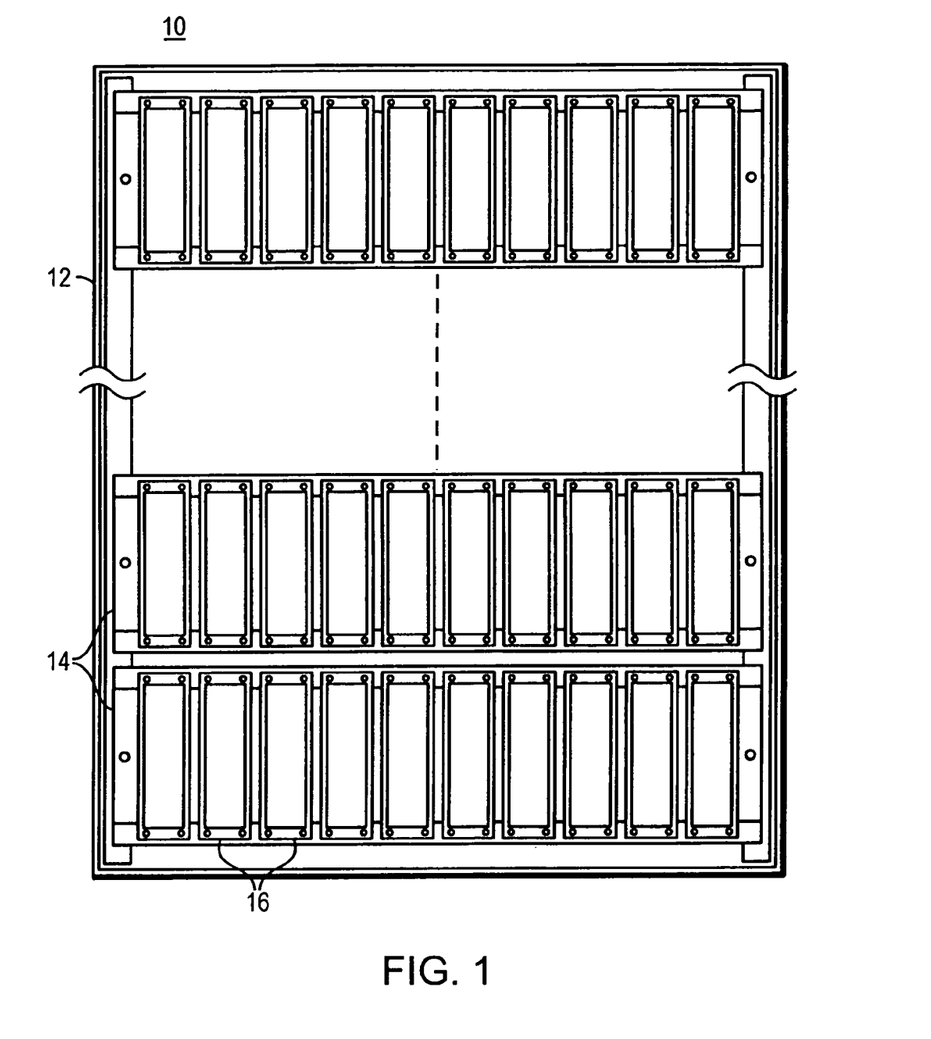
FIG. 1 is a representation of a rack mount system including several storage chassis.
Figure 2:
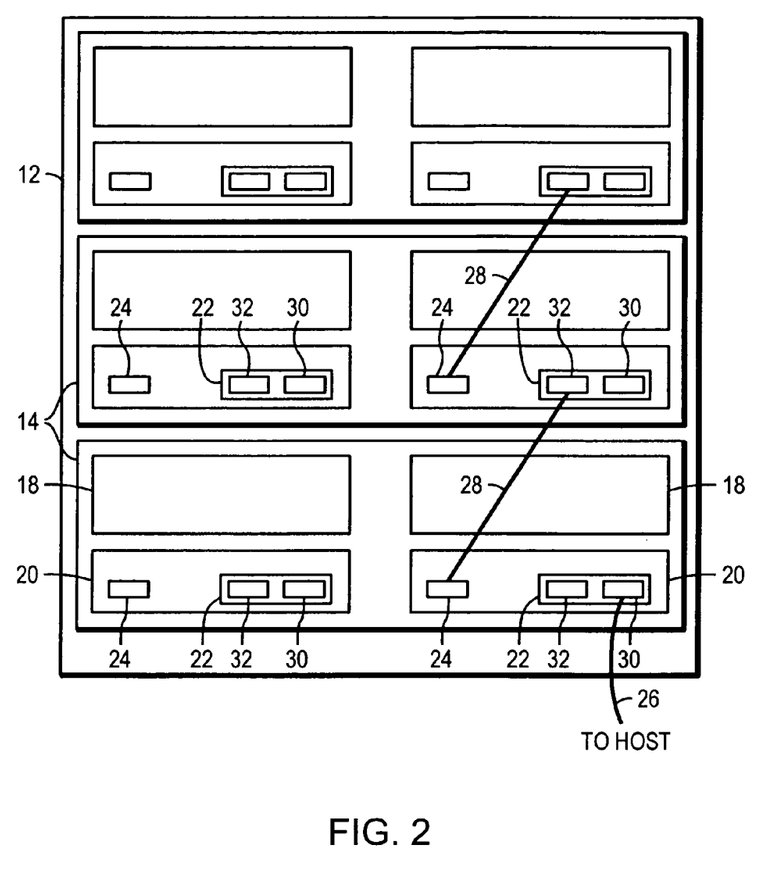
FIG. 2 is a rear view of the rack mount system and storage chassis of FIG. 1.

Referring to FIG. 1, there is shown an example of a storage system 10 in which the present invention may be employed. A rack mount cabinet 12 includes several storage chassis 14. Each storage chassis 14 includes several disk drives 16. The disk drives and the chassis are preferably interconnected via a serial bus loop or ring architecture, for example a Fibre Channel Arbitrated Loop (FC-AL). In FIG. 2 there is shown a rear view of the rack mount cabinet 12 and the storage chassis 14. Each storage chassis includes two power supplies 18, and two link control cards 20. The power supplies 18 and link control cards 20 are coupled to the disk drives 16 via a midplane within the chassis (not shown). The link control card 20 serves to interconnect the disks and chassis on the FC-AL. The power supplies and link control cards are redundant in order to provide high availability. The invention is equally applicable to a system including only a single link control card and power supply.

Each link control card includes a primary port 22 and an expansion port 24. These ports are used to link the storage chassis together on a single FC-AL. A cable 26 may come from a host or from another storage system, and plugs into the primary port 22. The FC-AL extends from the primary port 22, is coupled to the disk drives 16, and continues out the expansion port 24. A cable 28 couples the expansion port 24 of a first storage chassis 14 to the primary port 22 of a second storage chassis 14. All the storage chassis 14 are interconnected in this manner to form the FC-AL.

As seen in FIG. 2, the primary port 22 includes two input connectors 30 and 32. The first input connector 30 is a small form factor (SFF) connector, used for connecting to an optical cable. The second input connector 32 is a high speed serial data connector (HSSDC), used for connecting to a copper cable. Thus, either an optical or a copper cable may be plugged into the primary port 22. Copper cables are cost efficient but distance limited—they can transmit signals only a few tens of meters. Optical cables, on the other hand, can transmit signals for hundreds of meters. The arrangement as shown herein that allows the use of an optical cable as input to the primary port is particularly advantageous in a JBOD ("just a bunch of disks") environment, wherein the storage chassis may be located hundreds of meters from the host systems to which they are connected. As shown herein, an optical cable 26, which may extend from a host system hundreds of meters away, is plugged into the primary port SFF connector 30. A copper cable 28 then extends from the expansion port 24 to the primary port HSSDC connector 32 on the next storage chassis. The remainder of the storage chassis, being spaced close together, are interconnected via copper cables. The storage chassis employing the invention provides an advantage in that only a single type of storage chassis need be provided, regardless of the user's input cable requirements, thus minimizing the number of different parts and spares that must be ordered and maintained.

In accordance with the principles of the invention, the SFF connector 30 and the HSSDC connector 32 appear as a single connector to a processor and software that reside upon the link control card 20. Thus, a storage chassis 14 that includes only a single input connector, such as a single HSSDC connector, may be easily modified to include two input connectors, with no need to change the software run by the processor.

Figure 3:
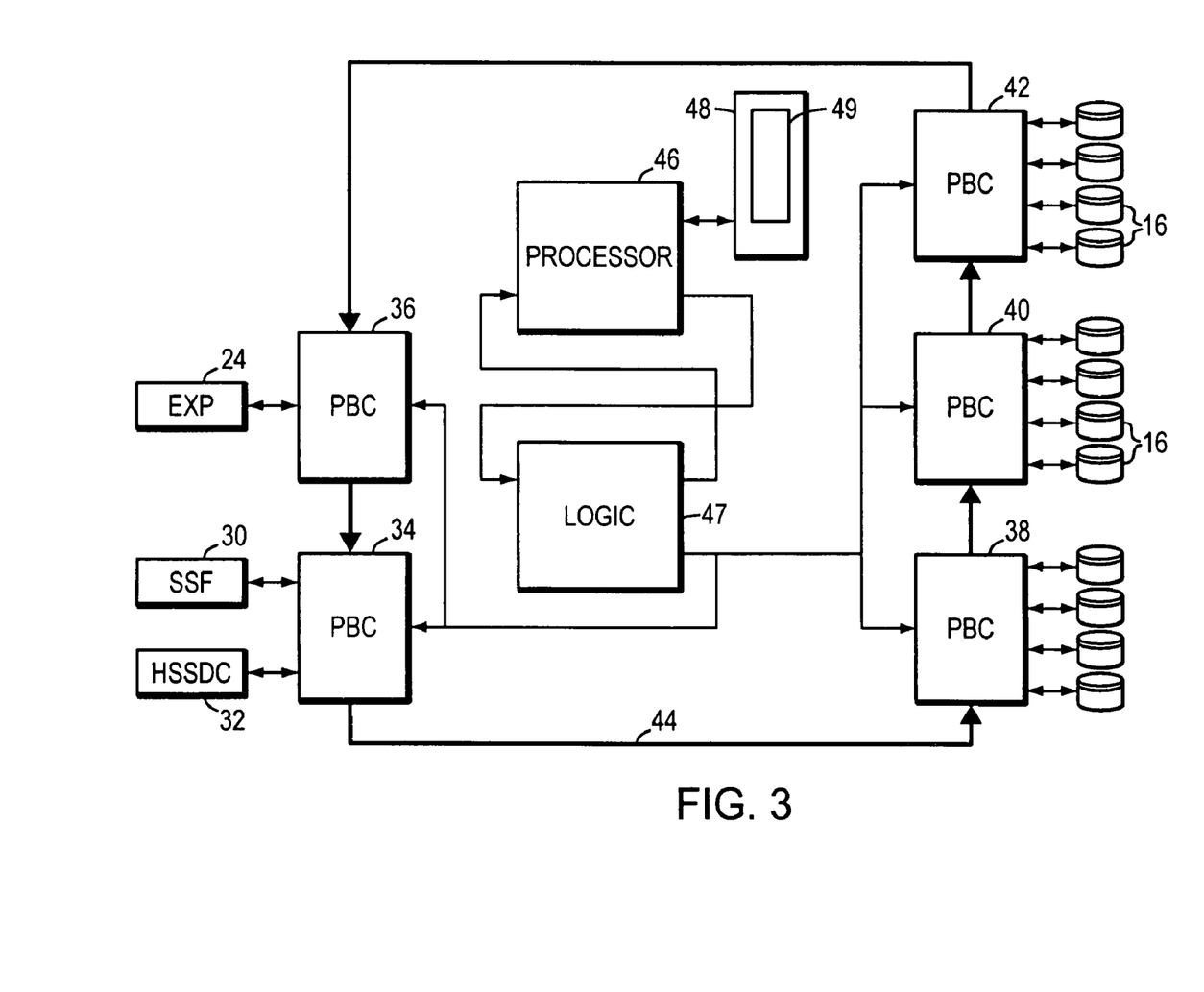
FIG. 3 is a schematic representation of a Fibre Channel arbitrated loop routed through a link control card.

Referring now to FIG. 3, the portion of the FC-AL that extends through a single link control card 20 is shown. The primary port 22 connectors 30 and 32 are coupled to a port bypass controller (PBC) 34. The expansion port connector 24 is coupled to another PBC 36. The disk drives 16 are coupled to several PBCs 38, 40, and 42. The PBCs are coupled together to form the FC-AL loop 44, shown in bold. A processor 46 and associated logic 47 are coupled to the PBCs and control their function. The processor 46 is coupled to a memory 48. Software 49 resides in the memory 48 and is executed by the processor 46.

Figure 4:
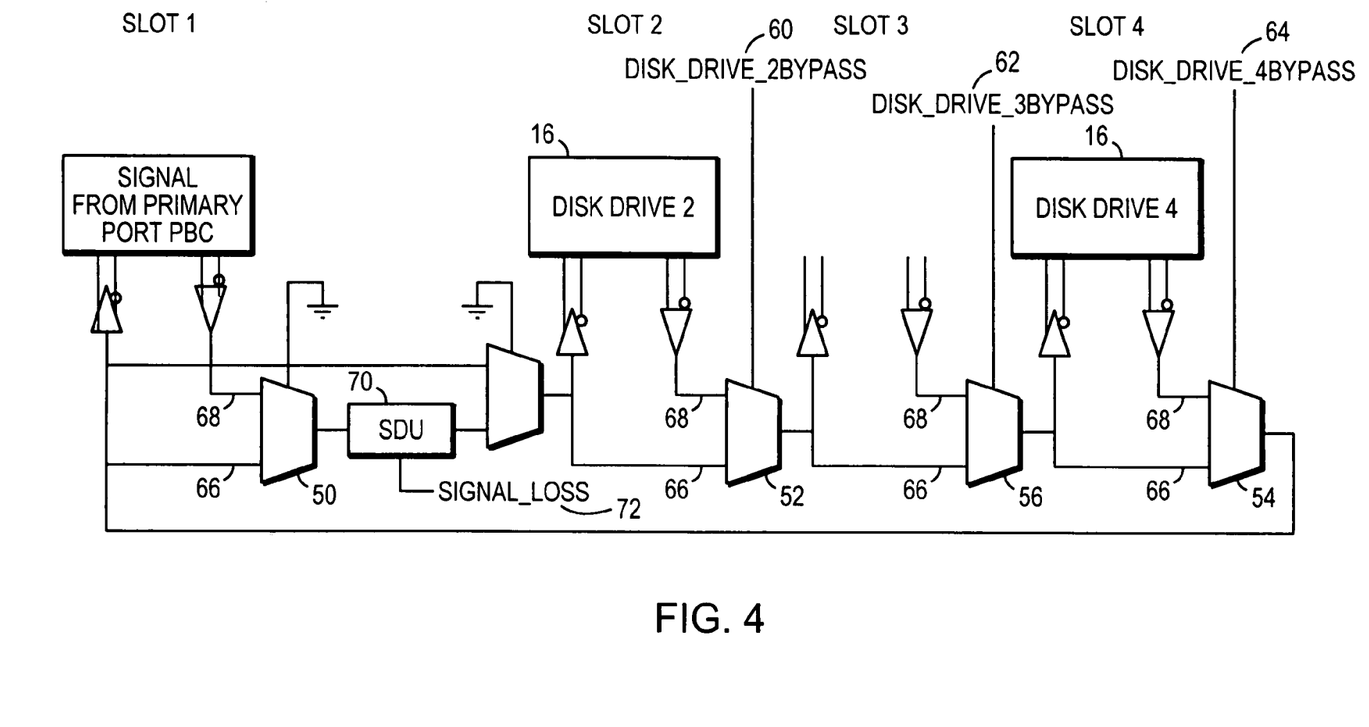
FIG. 4 is a schematic representation of the functionality of a port bypass controller.

The essential function of a PBC is shown in FIG. 4. PBCs are provided by several manufacturers—for example, the Vitesse VSC7129, or the AMCC S2058, might be employed. Available PBCs have certain functionality in common. The PBC is essentially a series of multiplexers that selectably add devices to the FC-AL or bypass the device slot. For example, the PBC 38 is shown. The input from the primary port PBC 34 is coupled to slot one and to a multiplexer 50. Two disk drives 16 are connected to slots 2 and 4 containing multiplexers 52 and 54 respectively, while slot 3 containing multiplexer 56 is empty. The strobe signals disk_drive_2bypass (60), disk_drive_3bypass (62), and disk_drive_4 bypass (64) are asserted when no drive is connected to the slot, so that the bypass path 66 is selected. Otherwise the input path 68 is selected to add the drives to the loop. In this case, the signals disk_drive_2_bypass, and disk_drive_4_bypass are deasserted and the primary port PBC 34 and drives 16 are part of the FC-AL loop. The signal disk_drive_3bypass is asserted to bypass slot 3 and pass the signals from slot 2 on to slot 4. Also included in the PBC is at least one signal detect unit (SDU) 70 coupled to a slot. The signal detect unit 70 provides an indication as to whether a valid FC-AL signal is present on the associated slot. As herein shown, the SDU is associated with slot 1, so if no signal is present from the primary port PBC 34, signal_loss (72) is asserted. The functionality of the PBC, along with the logic 47, are used to implement an embodiment of the invention.

In order for the processor 46 and software 49 to perceive the primary port 22 as including a single connector, the processor 46 and software 49 need to be aware of at least two things: whether a signal exists on the primary port 22, and whether the primary port 22 is bypassed. The processor 46 and software 49 also need to be able to selectably bypass the primary port 22. The logic 47 controls the primary port PBC 34 and provides this information to the processor 46 and software 49.

Figure 5:
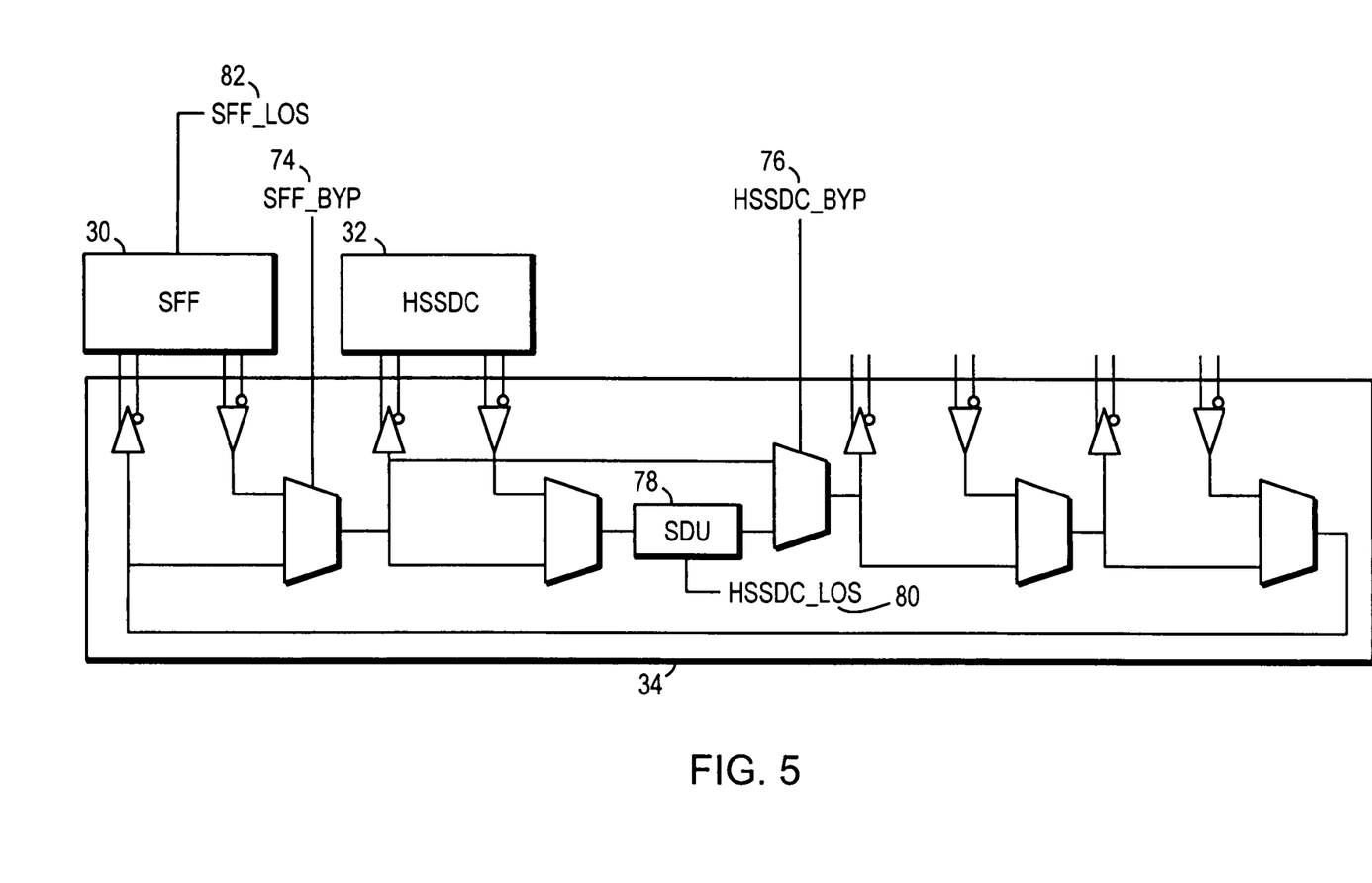
FIG. 5 is a schematic representation of a port bypass controller coupled to input connectors.

Referring to FIG. 5, there is shown the primary port PBC 34, as it is connected to the SFF connector 30 and the HSSDC connector 32. A strobe input SFF_BYP (74) controls whether the SFF connector signals are added to the loop or bypassed. When SFF_BYP is deasserted, the SFF connector signals are added to the loop. When SFF_BYP is asserted, the SFF connector signals are bypassed. A strobe input HSSDC_BYP (76) controls whether the HSSDC connector signals are added to the loop or bypassed. When HSSDC_BYP is deasserted, the HSSDC connector signals are added to the loop. When HSSDC_BYP is asserted, the HSSDC connector signals are bypassed. The HSSDC input is coupled to the SDU 78. The SDU 78 provides a signal HSSDC_LOS (80), which, when asserted, indicates signal loss on the HSSDC connector 32. The signal loss may be due to a malfunction or may be due to the fact that no cable is plugged into the HSSDC connector 32.

Figure 6:
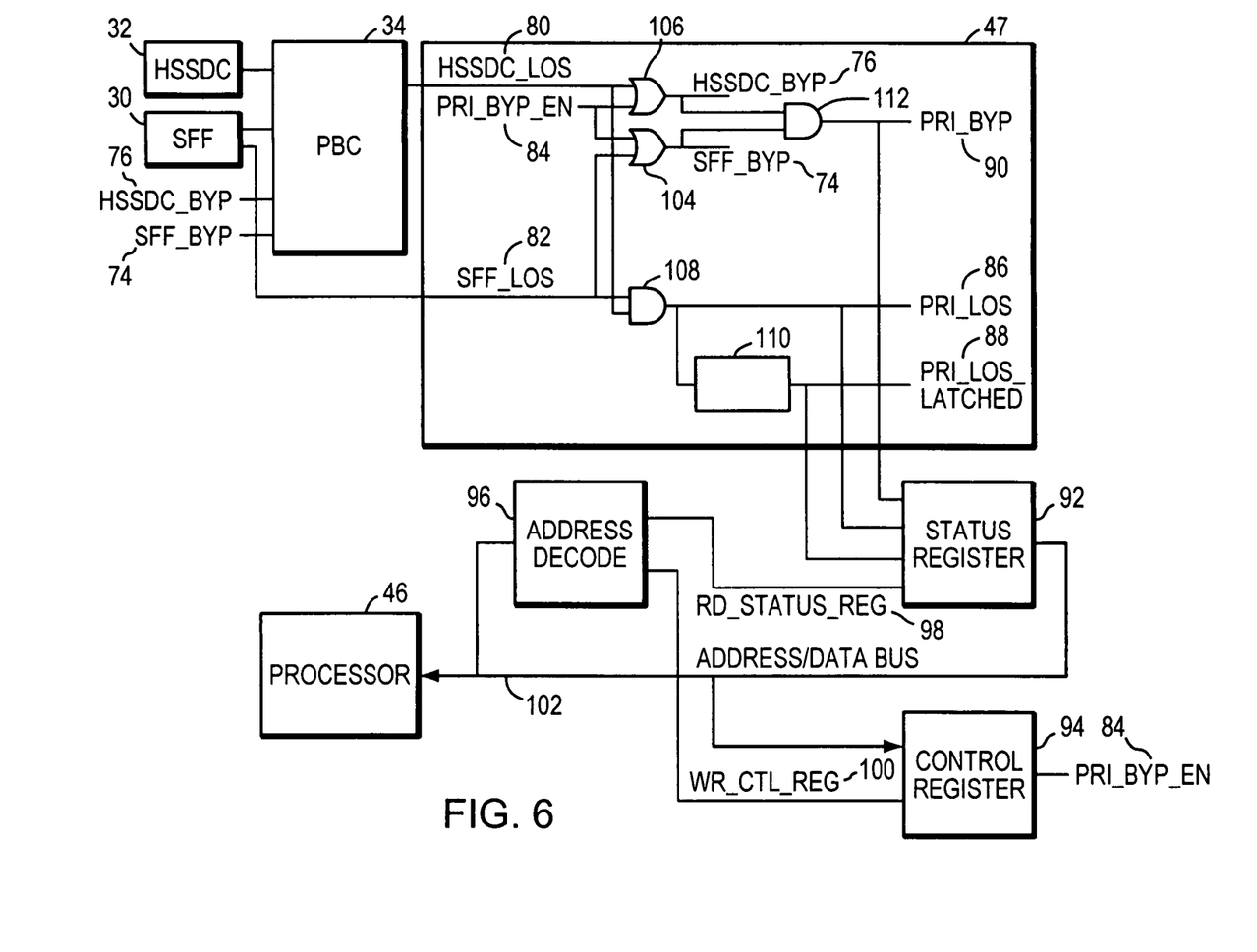
FIG. 6 is a schematic representation of logic coupling a port bypass controller and a processor in accordance with the principles of the invention.

Referring also to FIG. 6, the logic 47 accepts as input the strobe inputs SFF_BYP and HSSDC_BYP, and the HSSDC_LOS signals. The logic 47 also accepts as input a signal SFF_LOS (82), which is provided on the SFF connector 30. When an optical cable is plugged into the SFF connector 30, the signal SFF_LOS is deasserted. When no cable is plugged into the SFF connector 30, or when there is a malfunction associated with the signals on the SFF connector 30, the signal SFF_LOS is asserted. The logic 47 also accepts as input a signal PRI_BYP_EN (84), which is a signal asserted by the processor 46 under software control and is used to bypass the primary port 22, for diagnostic or failover purposes. The logic 47 produces as output the signals SFF_BYP and HSSDC_BYP. (These two signals are both output from and fed back as input to the logic 47.) The logic 47 also produces outputs PRI_LOS (86) and PRI_LOS_LATCHED (88), which indicate to the processor 46 and software 49 that there is no valid FC-AL signal on the primary port 22. The logic 47 also produces as output the signal PRI_BYP (90), which indicates to the processor 46 and software 49 that the primary port is bypassed. The logic 47 is coupled to a status register 92 and to a control register 94. The signals PRI_LOS, PRI_LOS_LATCHED, and PRI_BYP are input to the status register 92. The processor 46, under control of the software 49, reads the status register 92 to determine the status of the primary port 22. The signal PRI_BYP_EN is output from the control register 94. The processor 46, under control of the software 49, can write the control register 94 to assert the PRI_BYP_EN signal to bypass the primary port 22, as will be further described. The processor 46 is coupled to an address decoder 96, which produces the signals RD_STATUS_REG (98) and WR_CTL_REG (100). The address decoder 96 decodes the address/data bus 102 to assert these signals to read the status register 92 or write the control register 94 respectively.

The logic 47 operates as follows. In normal operation, a user will either plug an optical cable into the SFF connector 30 or plug a copper cable into the HSSDC connector 32. Assume first that the user has plugged in an optical cable and left the HSSDC connector 32 empty. In this case, SFF_LOS will be deasserted and the signal HSSDC_LOS will be asserted. Assuming for now that the software controlled signal PRI_BYP_EN is deasserted, the 'or' gate 104 deasserts the strobe signal SFF_BYP. The deasserted strobe signal SFF_BYP is input to the PBC 34 and causes the SFF connector 30 signals to be joined into the FC-AL loop. Meanwhile, because no cable is plugged into the HSSDC connector 32, the signal HSSDC_LOS from the SDU 78 in the PBC 34 is asserted. The 'or' gate 106 therefore asserts the strobe signal HSSDC_BYP, thereby causing the HSSDC connector 32 to be bypassed on the loop. Thus, the PBC 34 is configured to pass the signals from the SFF connector 30 through the loop while bypassing the HSSDC connector 32. The 'and' gate 108 logically "ands" the HSSDC_LOS and SFF_LOS signals to produce the PRI_LOS signal. Since the SFF_LOS signal is deasserted, the PRI_LOS signal is deasserted. The PRI_LOS signal is latched via the latch 110 to produce the signal PRI_LOS_LATCHED. These signals are input to the status register 92, and can be read by the processor 46. When deasserted, these signals indicate to the processor 46 and software 49 that a valid FC-AL signal is input to the PBC 34—though the processor 46 and software 49 are unaware of whether the signal is sourced from the HSSDC connector 32 or from the SFF connector 30.

Assume next that the user has plugged in a copper cable and left the SFF connector 30 empty. In this case, the SDU 78 in the PBC 34 will detect a valid signal on the HSSDC connector 32, and will deassert the signal HSSDC_LOS. The signal SFF_LOS will be asserted because there is no valid signal on the SFF connector 30. Assuming again that the software controlled signal PRI_BYP_EN is deasserted, the 'or' gate 106 deasserts the strobe signal HSSDC_BYP. The deasserted strobe signal HSSDC_BYP is input to the PBC 34 and causes the HSSDC connector signals to be joined into the FC-AL loop. Meanwhile, because no cable is plugged into the SFF connector 30, the signal SFF_LOS from the SFF connector 30 is asserted. The 'or' gate 104 therefore asserts the strobe signal SFF_BYP, thereby causing the SFF connector 30 to be bypassed on the loop. Thus, the PBC 34 is configured to pass the signals from the HSSDC connector 32 through the loop while bypassing the SFF connector 30. Since the HSSDC_LOS signal is deasserted, the PRI_LOS signal from the 'and' gate 108 is deasserted. This indicates to the processor 46 and software 49 that a valid FC-AL signal is input to the PBC 34—though again, the processor 46 and software 49 are unaware of whether the signal is sourced from the HSSDC connector 32 or from the SFF connector 30.

Next, assume that there are no connectors plugged into either the HSSDC or the SFF connectors. In this case, both the HSSDC_LOS and the SFF_LOS signals will be asserted. Therefore both the HSSDC_BYP and the SFF_BYP signals will be asserted by the 'or' gates 106 and 104. The PBC 34 will then bypass both the HSSDC and the SFF connectors 32 and 30, effectively bypassing the primary port 22 as a whole. Furthermore, the output of the 'and' gate 108, PRI_LOS, will be asserted. This indicates to the processor 46 and software 49 that there is no valid signal coming from the primary port 22. The HSSDC_BYP and SFF_BYP signals are also input to an 'and' gate 112, which produces an output PRI_BYP. Since the HSSDC_BYP and the SFF_BYP signals are both asserted by the or gates 104 and 106, the PRI_BYP signal is asserted, indicating to the processor 46 and software that the primary port 22 is bypassed. If one or both of the HSSDC or SFF connectors 32 and 30 have cables plugged into them but are otherwise malfunctioning such that no valid signal exists on either one, the result is the same.

From time to time it may be desirable to bypass the primary port 22, for diagnostic or failover purposes or the like. The control register 94 provides the signal PRI_BYP_EN for this purpose. The processor 46 may assert this signal under control of the software 49. The PRI_BYP_EN signal is input to the 'or' gates 104 and 106. Thus, when the PRI_BYP_EN signal is asserted, both the HSSDC_BYP and the SFF_BYP signals are asserted, causing the PBC 34 to bypass both the HSSDC and SFF connectors, regardless of whether valid signals exist on either one. Since the HSSDC_BYP and SFF_BYP signals are asserted, the 'and' gate 112 asserts the PRI_BYP signal, indicating to the processor 46 and software 49 that the primary port 22 is bypassed.

Next assume that a user has plugged an optical cable into the SFF connector 30, and has plugged a copper cable into the HSSDC connector 32, and both cables carry valid FC-AL signals. In this case, assuming that PRI_BYP_EN is deasserted, neither the HSSDC_BYP nor the SFF_BYP signal will be asserted. Therefore both connectors will be coupled into the loop. The PRI_LOS and PRI_BYP signals are deasserted, indicating to the processor 46 and software 49 that the primary port 22 is producing a functional signal.

The production by the logic 47 of at least the signals PR_LOS and PRI_BYP provide the processor 46 and software 49 with information needed to know whether a valid signal exists on the primary port 22, and whether the primary port 22 is bypassed. This is the same information that would be available and used by a device having only a single input connector. Thus, the software 49 need not be any different from software that would run on a device that has only a single input connector.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, though the invention has been described in the context of a storage system, it will be apparent to the skilled artisan that the invention is applicable in any system where it would be advantageous to include two input connectors in a manner that is transparent to software. The logic functions have been described in terms of certain types of gates, yet the skilled artisan will realize that there are many equivalent ways of implementing the described functionality, and that the described signals may be asserted at either a logical '1' or '0' level. Though the preferred embodiment employs a Fibre Channel arbitrated loop architecture, the invention may be deployed with any channel or network protocol in which multiple different connectors may be used. The preferred embodiment employs SFF and HSSDC connectors; however, other copper connectors may be used, such as a DB9 connector, and other optical connectors could be employed, such as an SC or ST connector. All such modifications are intended to fall within the scope of the following appended claims. Accordingly, the claims set forth below should be construed in view of the full breadth and spirit of the present invention as disclosed herein.

We claim:

1. Apparatus comprising:

a first input associated with a port;

a second input associated with the port; and logic for producing indications to software to cause the first input and second input to appear as a single input to the software, including logic operable to select only one of the first and second inputs for communication with the software at a given point in time, wherein the logic produces an indication that no signal is present on either the first input or the second input.

2. The apparatus of claim 1 wherein a port bypass controller is coupled to the port, and wherein the logic produces an indication that both the first and second inputs are bypassed.

3. The apparatus of claim 2 wherein the port bypass controller is coupled to a Fibre Channel arbitrated loop.

4. The apparatus of claim 3 wherein the logic produces a first signal to control whether the first input is included on the Fibre Channel arbitrated loop or bypassed, and a second signal to control whether the second input is included in the Fibre Channel arbitrated loop or bypassed.

5. Apparatus comprising:

a port bypass controller;

first and second connectors coupled to the port bypass controller;

a first loss of signal indicator indicating whether a signal exists on the first connector;

a second loss of signal indicator indicating whether a signal exists on the second connector;

logic for producing:

a first bypass signal responsive to the first loss of signal indicator, the first bypass signal input to the port bypass controller for controlling whether the first connector is coupled to a Fibre Channel arbitrated loop or bypassed;

a second bypass signal responsive to the second loss of signal indicator, the second bypass signal input to the port bypass controller for controlling whether the second connector is coupled to a Fibre Channel arbitrated loop or bypassed;

a port loss of signal indicator responsive to the first loss of signal indicator and the second loss of signal indicator, the port of loss of signal indicator indicating to software that no signal is input to the port bypass controller from either connector; and a port bypass signal responsive to the first bypass signal and the second bypass signal, the port bypass signal indicating to software that both connectors are bypassed.

6. A method comprising the steps of;

providing a first input associated with a port;

providing a second input associated with the port; and producing indications to software to cause the first input and second input to appear as a single input to the software, including selecting only one of the first and second inputs for communication with the software at a given point in time, wherein the step of producing produces an indication that no signal is present on either the first input or the second input.

7. The method of claim 6 further comprising the step of coupling a port bypass controller to the port, and wherein the step of producing produces an indication that both the first and second inputs are bypassed.

8. The method of claim 7 further comprising the step of coupling the port bypass controller to a Fibre Channel arbitrated loop.

9. The method of claim 8 wherein the step of producing produces a first signal to control whether the first input is included on the Fibre Channel arbitrated loop or bypassed, and a second signal to control whether the second input is included in the Fibre Channel arbitrated loop or bypassed.

10. A method comprising the steps of:

coupling first and second connectors to a port bypass controller;

providing a first loss of signal indicator indicating whether a signal exists on the first connector;

providing a second loss of signal indicating whether a signal exists on the second connector;

producing:

a first bypass signal responsive to the first loss of signal indicator, the first bypass signal input to the port bypass controller for controlling whether the first connector is coupled to a Fibre Channel arbitrated loop or bypassed;

a second bypass signal responsive to the first loss of signal indicator, the second bypass signal input to the port bypass controller for controlling whether the second connector is coupled to a Fibre Channel arbitrated loop or bypassed;

a port loss of signal indicator responsive to the first loss of signal indicator and the second loss of signal indicator, the port loss of signal indicator indicating to software that no signal is input to the port bypass controller from either connector;

a port bypass signal responsive to the first bypass signal and the second bypass signal, the port bypass signal indicating to software that both connectors are bypassed.

\* \* \* \* \*